United States Patent [19]

Jackson

[11] 4,423,096

[45] Dec. 27, 1983

[54] METHOD FOR PROTECTING POROUS CERAMIC BUILDING MATERIALS EXPOSED TO WEATHERING

[75] Inventor: David E. Jackson, Glen Ellyn, Ill.

[73] Assignee: Nalco Chemical Company, Oak Brook, Ill.

[21] Appl. No.: 438,992

[22] Filed: Nov. 3, 1982

[51] Int. Cl.$^3$ .............................................. B05D 5/00
[52] U.S. Cl. ................................ 427/397.7; 428/325; 428/331; 428/446; 52/515; 52/741
[58] Field of Search ..................... 164/519; 427/397.7; 428/446, 325, 331; 52/741, 612, 596, 515

[56] References Cited

U.S. PATENT DOCUMENTS

| | | |
|---|---|---|
| 2,244,325 | 6/1941 | Bird . |
| 2,386,247 | 10/1945 | Marshall . |
| 2,574,902 | 11/1951 | Bechtold et al. . |
| 2,601,235 | 6/1952 | Alexander et al. . |
| 2,680,721 | 6/1954 | Broge et al. . |
| 2,856,302 | 10/1958 | Reuter . |
| 3,130,061 | 4/1964 | McMahon ............................. 106/84 |
| 4,041,199 | 8/1977 | Cartwright ..................... 428/466 X |
| 4,109,032 | 8/1978 | Barrall .................... 52/515 |
| 4,223,716 | 9/1980 | Ostrowski .......................... 164/519 |
| 4,335,755 | 6/1982 | Sadler et al. ................. 427/397.7 X |

FOREIGN PATENT DOCUMENTS 2071173  9/1981  United Kingdom ................. 52/515

Primary Examiner—Shrive P. Beck
Attorney, Agent, or Firm—John G. Premo; Robert A. Miller; Donald G. Epple

[57] ABSTRACT

A method of protecting porous ceramic building materials exposed to weathering which comprises coating the exposed surfaces of such porous ceramics with a composition comprising an aqueous silica sol having suspended therethroughout a finely divided granular ceramic powder.

2 Claims, No Drawings

METHOD FOR PROTECTING POROUS CERAMIC BUILDING MATERIALS EXPOSED TO WEATHERING

INTRODUCTION

Exposed brick work, stone, and mortar is detrimentally affected by freeze/thaw cycles in the winter months, especially where there is exposure to high wind. The wind drives rain or other water into the porous brick work and mortar. The water freezes, thereby cracking and eroding the bricks and mortar. The surface must then be rebricked and tuckpointed.

If it were possible to reduce the effect of weather on building materials as described above, an advance in the art would be afforded. Particularly advantageous would be the provision of a simple chemical coating composition that could treat these exposed ceramic building materials which would prevent them from being damaged by the action of atmospheric forces.

THE INVENTION

A method of protecting porous ceramic building materials exposed to weathering which comprises coating the exposed surfaces of such porous ceramics with a composition comprising an aqueous silica sol having suspended therethroughout a finely divided granular ceramic powder.

In the above composition, the finely divided granular ceramic powders should have a mesh size, standard sieve series, not exceeding 125 mesh and, preferably, not exceeding 325 mesh. Also, in a preferred embodiment of the invention, the finely divided ceramic powder is silica flour.

THE FINELY DIVIDED GRANULAR CERAMIC POWDERS

As indicated, these materials are preferably composed of finely divided silica flour although they may be chosen from such other ceramic materials as vitreous silica or water-insoluble metal silicates such as magnesium silicate, aluminum silicate, zirconium silicate, or siliceous clays. There may be employed, however, non-siliceous refractories such as alumina.

These materials are all well-known substances and are all commercially available. Typical aluminum silicates, for example, may include mica, a laminated type of aluminum silicate and mullite, an orthorbombic aluminum silicate available from the Island of Mull or artificially made by heating andalusite, sillimanite or cyanite. Excellent magnesium silicates are forsterite or talc, while a useful zirconium silicate is zircon. A typical crystalline silica is quartz.

THE SILICA SOLS

There are well known materials and are commercially available from several sources of supply. A typical group of commercially available silica sols that may be used in the practices of the invention are those silica sols sold under the name "NALCOAG." Silica sols of this type are described below in Table I.

TABLE I

| Silica Sol | I | II | III | IV | V | VI |
| --- | --- | --- | --- | --- | --- | --- |
| Percent colloidal silica as SiO$_2$ | 15 | 30 | 35–36 | 31–22 | 49–50 | 35 |
| pH | 8.6 | 10.2 | 8.6 | 3.7 | 9.0 | 3.5 |
| Viscosity at 77° F. cps | Less than 5 | Less than 5 | Less than 5 | Less than 10 | 20–30 | 6.5 |
| Specific Gravity at 68° F. | 1.09 | 1.205 | 1.255 | 1.06 | 1.385 | 1.255 |
| Average Surface Area M$^2$ per gram of SiO$_2$ | 330–430 | 190–270 | 135–190 | 135–190 | 120–150 | 135–190 |
| Average particle size millimicrons | 7.9 | 11–16 | 16–22 | 16–22 | 20–25 | 16–22 |
| Density lbs./U.S. gallon at 68° F. | 9.1 | 10.0 | 10.5 | 8.8 | 11.6 | 10.5 |
| Na$_2$O Percent | 0.04 | 0.40 | 0.10 | 0.05 | 0.30 | 0.01 |

Other silica sols that may be used, in addition to those above, may be prepared by using several well-known conventional techniques. A convenient method of making aqueous colloidal silica sols is described in Bird, U.S. Pat. No. 2,244,355, wherein a dilute solution of an alkali metal silicate is passed in contact with a cation exchange resin in hydrogen form, whereby the silicate is converted to a dilute aqueous colloidal silica sol. The dilute sol may be concentrated to solids concentrations which are more economically usable from the standpoint of shipping costs and ultimate process use by employing the techniques described in either Bechtold, et al., U.S. Pat. No. 2,574,902; Broge, et al., U.S. Pat. No. 2,680,721; or "Alexander, et al., U.S. Pat. No. 2,601,235. Another type of silica sol which may be used in the practices of the invention is described in the specification of Reuter, U.S. Pat. No. 2,856,302.

While aqueous colloidal silica sols may be used, it will be understood that other forms of colloidal silica may be employed such as, for instance, sols which contain a major portion of polar organic solvents. Said sols may be generically referred to as organo sols and are typified by the sols described in Marshall, U.S. Pat. No. 2,386,247. It is only necessary that the silica particles used can be dispersed colloidally in a hydrophilic substance such as water or lower alkyl alcohols and other organic compounds possessing relatively high dielectric constants.

In some instances, mixtures of water and organic substances compatible with water may be employed as suspending media for the colloidal silica particles. Particularly preferred organic substances are those which lower the freezing point of pure aqueous sols by their admixture with these aqueous silica sols. Such final product sols then are especially useful during the colder months of the year when they must be stored and/or used at relatively low temperatures. A preferred sol, "winterized" against freezing, contains 5–50 parts by weight of polyhydroxy compound such as ethylene glycol, 20–85 parts by weight of water, and 10–60 parts by weight of silica.

Regardless of the method employed to produce the colloidal silica sol containing water, polar organic liquids, or mixtures of these substances as a continuous suspending phase, it is desirable that said sols contain silica particles which are dense, amorphous, and have an average particle diameter which does not exceed 150 millimicrons. As evidenced by a reading of Table I, all the silica sols contemplated as starting materials have an average particle size diameter well below 150 millimicrons. Preferably, the starting silica sols have an average particle size diameter of from 10–50 millimicrons. The silica concentration in the sols may be between 0.1% and 60% by weight silica expressed as $SiO_2$. More preferred sols contain from 3.0 to 60% by weight of silica and, most preferably, 10–60% by weight.

Other sols which may be employed as binders for the silica refractory are those known as "salt-free" silica sols. These are particularly preferred when the suspension media of the silica particles in the binder itself is solely a polar organic liquid or a mixture of water and polar organic liquid. Since many of the above described sols usually contain alkali metal compounds as stabilizers, they are generally not compatible with orgnic systems due to the fact that the salts present in the aqueous sol cause gelation or precipitation of the silica particles when the aqueous phases are exchanged for polar organic solvents. This can be avoided by use of "salt-free" aqueous silica sols as starting materials in preparation of pure organosols or mixtures of water and organic as silica carriers. In order to avoid this gelation effect, it is necessary that the causative cations be removed from the surface of the colloidally dispersed silica particles and from the liquid phase of the sol. This may be readily accomplished by treating typical silica sols of the type described in Bechtold, et al., U.S. Pat. No. 2,574,902, with a cation exchange resin in the hydrogen form and a strong base anion exchange resin in hydroxide form. This treatment tends to produce a finished aqueous sol in which both the continuous aqueous phase of the sol and the particles of silica are considered "salt-free". Typical commercially available silica sols which may be deionized to produce "salt-free" silica sols are those which are described in Table I above.

When the particle sizes of the silica sols described above are within the ranges specified, the silica particles present in the starting aqueous or organic sol have specific surface areas of at least 20 $m^2/g$, and usually in excess of 100 $m^2$. Further, when deionized sols are employed as a binder, they generally have a salt content expressed as $Na_2SO_4$, of less than 0.01%.

THE PARTICLE SIZE OF THE FINELY DIVIDED GRANULAR CERAMIC POWDER

The particle size of the ceramic powder may vary over a wide range. It is preferred, however, that the particles be sufficiently small so that a uniform dispersion of particles and silica sol may be made. The smaller the particle size, the longer a slurry made up of binder and ceramic powder remains in a homogeneous state. It has been determined that particles ranging in size from 125 mesh to as low as a fraction of a micron may be employed. Preferred ceramic powder materials have an average particle size ranging from 20 to 500 microns in particle diameter, with particles corresponding to the smallest size being most preferred.

TYPICAL COMPOSITIONS THAT MIGHT BE PREPARED TO PRACTICE THE INVENTION

It is preferred to make up the compositions for use commercially as concentrated suspensions which resemble paint in consistency. Typical of such compositions are set forth below as Compositions 1 and 2.

| Ingredients | Percent by Weight |
| --- | --- |
| Composition 1 | |
| Finely divided ceramic powder | 10–70 |
| Binder including liquid | 30–90 |
| Suspending agent | up to about 2 |
| Composition 2 | |
| Finely divided silica flour (325 mesh) | 50 |
| Silica sol containing 30% $SiO_2$ in water | 43.2 |
| Ethylene glycol | 6.5 |
| Suspending agent (Kelzan) | 0.3 |

In many instances, and as indicated earlier, it is desirable to combine with these products ethylene glycol for use as an antifreeze agent. It is also desirable to use a suspending agent such as Kelzan which is a Xanthomonas hydrophilic colloid. Other suspending agents such as polyacrylic acid, carboxymethyl cellulose, and polyacrylamide may be used.

Compositions of the above type are too thick for most applications since they would resemble a paint-type coating on the surfaces to be treated. Therefore, it is desirable that such typical compositions would be diluted with water to produce a finished product containing not more than 10% by weight of active ingredients, preferably 5% by weight or less.

It is understood that the products would be coated by brushing, spraying, rolling, or the like so that uniform application would be achieved. It would be beneficial that they be applied generously to allow the liquid containing the colloidal silica sol particles and the ceramic powders to be absorbed into the porous building material.

In order to illustrate how the invention might be used, a product corresponding to Composition 2 would be diluted about 15 times its own weight with water. It would then be sprayed onto a brick wall which was composed of red clay brick and conventional mortar. Such a coating would be expected to increase the life of the treated surfaces by between 5–30%.

It is understood that a wide variety of ceramic construction materials may be treated in accordance with the invention. They include brick, mortar, building stone of all types, building materials of volcanic origin, cement products, and the like.

Having thus described my invention, I claim:

1. A method of protecting porous ceramic building materials such as brickwork, stone, and mortar exposed to weathering which comprises coating the exposed surfaces of such porous ceramics with a composition comprising an aqueous silica sol having suspended therethroughout a finely divided granular ceramic powder.

2. The method of claim 1 where the finely divided ceramic powder is silica flour having a particle size not greater than 125 mesh.

* * * * *